United States Patent
Watters et al.

[11] 3,798,823
[45] Mar. 26, 1974

[54] FISHING APPARATUS

[76] Inventors: Robert S. Watters; Edward E. Watters, both of 2457 Regent Ln., Birmingham, Ala. 35226

[22] Filed: June 4, 1973

[21] Appl. No.: 366,875

[52] U.S. Cl. .................. 43/23, 43/42.06, 43/44.99
[51] Int. Cl. ...................... A01k 87/00, A01k 97/02
[58] Field of Search ......... 43/23, 42.06, 44.99, 26.2

[56] References Cited
UNITED STATES PATENTS

| | | | |
|---|---|---|---|
| 2,583,660 | 1/1952 | Moore | 43/44.99 X |
| 2,796,605 | 6/1957 | Ashley | 43/26.2 |
| 3,269,049 | 8/1966 | Emmons | 43/23 |

Primary Examiner—Robert Peshock
Assistant Examiner—Daniel J. Leach
Attorney, Agent, or Firm—Jennings, Carter & Thompson

[57] ABSTRACT

A tubular line is wound on a reel on a fishing rod with one end being free and passing outwardly of the reel. A pump is carried by the rod with the outlet of pump connected to the other end of the tubular line and inlet of pump receiving liquid. A lure connected to the free end of the line moves in water and a discharge opening is provided in the free end of the line discharging liquid outwardly of lure into the water. Scented bait in solution is supplied to the inlet of the pump, thus providing controlled remote baiting of a specific area of the water.

7 Claims, 4 Drawing Figures

“3,798,823”

FISHING APPARATUS

BACKGROUND OF THE INVENTION

This invention relates to fishing apparatus and more particularly to means for positively controlling the action of a fish lure and supplying scented bait to a specific area by discharging streams of liquid outwardly of the lure into the adjacent water.

Heretofore in the art to which our invention relates, devices have been proposed for discharging air into a lure whereby the lure is expanded and contracted to simulate movement of the lure, 44 may as described in the Ashley U.S. Pat. No. which the 2,796,605, issued June 18, 1957. The introduction of air into the lure for expanding the lure requires a completely enclosed lure and supply line therefor which is complicated in structure and difficult to maintain in a leak-proof condition. While air has been employed to propel objects through water, the use of air causes bubbles to move to the surface whereby the fish are frightened. Also, the use of air produces undue noises which frighten fish.

BRIEF SUMMARY OF INVENTION

In accordance with our invention we provide a hollow line which is wound on a reel with one end being free and passing outwardly of the reel and with the other end thereof being connected to the outlet of a pump. The inlet of the pump communicates with a source of liquid. A lure is connected to the free end of the line and is provided with a discharge opening which discharges liquid outwardly of the lure into the adjacent water. Scented baits of various types in solution is supplied to the inlet of the pump whereby the scented bait is discharged adjacent the lure and remains in the vicinity of the lure.

DESCRIPTION OF DRAWING

Apparatus embodying features of our invention is illustrated in the accompanying drawing, forming a part of this application, in which:

Referring now to the drawing for a better understanding of our invention, we show a fishing rod 10 having a bail type reel 11 attached thereto. The reel 11 is provided with a spool 12 which carries a hollow, tubular line 13. As shown in FIG. 1, the tubular line 13 extends along the rod 10 with the free end of the line 13 extending outwardly of the rod. As shown in FIG. 3, the free end of the tubular line 13 extends through a lure body 14 and is provided with a discharge opening 16 in position to discharge liquid outwardly of the lure body 14 adjacent the tail thereof and into the water adjacent thereto. The fish lure 14 is provided with a hook 17 which may be connected to the tubular line 13 by a leader 18, as shown.

In FIG. 4 of the drawing, we show a slightly modified form of lure body 14a wherein the tubular line 13 extends through the lure body and then extends outwardly of the lure body intermediate the ends of the body in position to discharge liquid outwardly of the lure and into the water adjacent thereto. Accordingly, the liquid is discharged outwardly of the lure a substantial distance forwardly of the tail portion of the lure. The lure body 14a carries a fish hook 17a which is connected to the tubular line 13 by a leader 18a.

Figure 2:
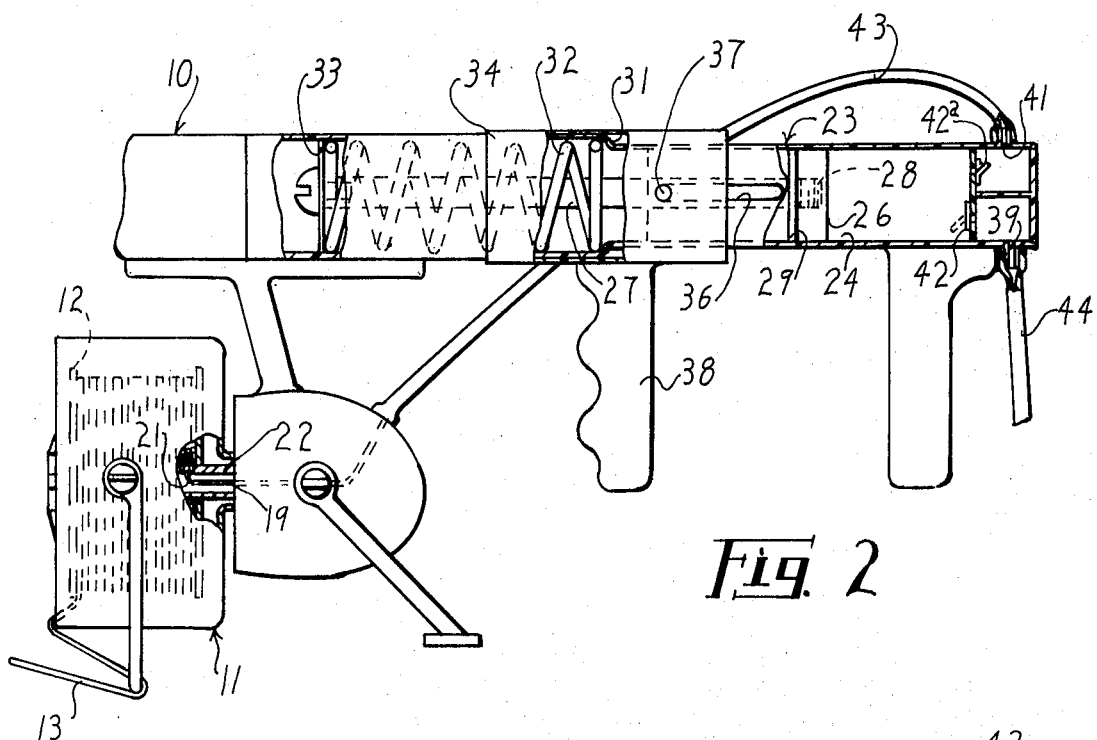
FIG. 2 is an enlarged, fragmental view, partly broken away and in section.
Figure 1:
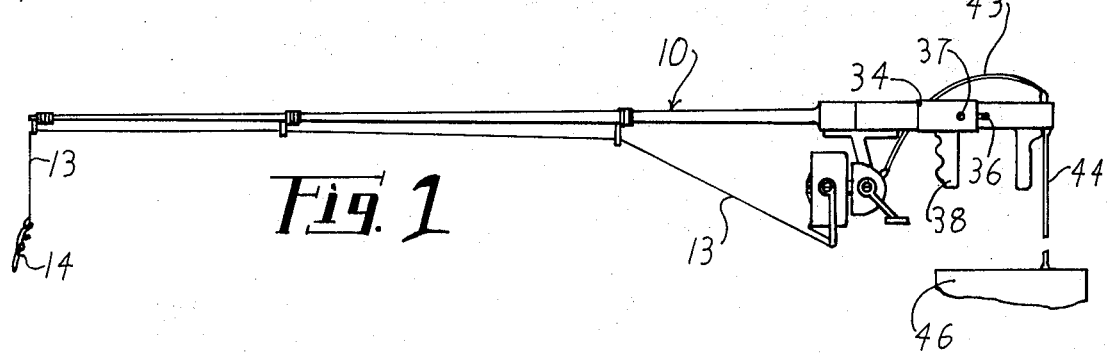
FIG. 1 is a side elevational view showing our improved fishing apparatus.
Figure 4:
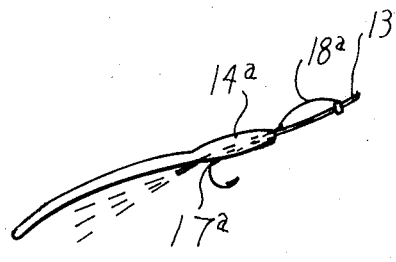
Figure 3:
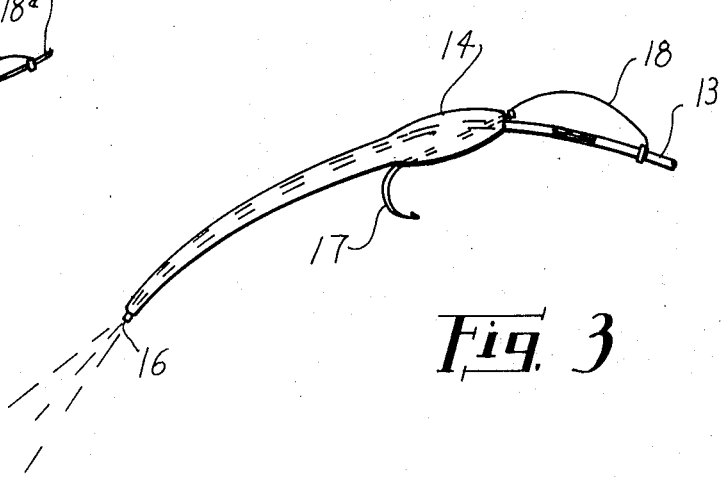
FIG. 3 is a side elevational view showing the fish lure and the tubular line connected thereto with the discharge opening being in position to discharge liquid adjacent the tail of the lure; and, FIG. 4 is a side elevational view showing a different type lure wherein the stream of liquid is discharged intermediate the ends of the lure.

Communicating with the other end of the tubular line 13 is a branch line 19 which extends through an opening 21 provided in the hub portion of the spool 12 and then extends axially through a cylindrical member 22 which supports the spool 12. It will be understood that with bail-type reels, the spool 12 does not rotate but merely moves back and forth to provide for level wind as the line is wound on the reel. The branch line 19 may be formed of a rigid material, such as metal or the like which is adapted to project inwardly of the adjacent end of the tubular line 13, as shown in FIG. 2.

Mounted within the rear portion of the rod 10 is a fluid pump indicated generally at 23 which comprises an elongated cylinder 24 which extends axially of the rod 10. Mounted for sliding movement within the cylinder 24 is a piston 26 which is threadedly connected to a piston rod 27 by threads 28. A suitable O-ring 29 surrounds the piston 26, as shown in FIG. 2, to provide a fluid tight fit between the piston and the cylinder.

The forward portion of the cylinder 24 is enlarged in diameter to provide a shoulder 31 which serves as a spring abutment for a compression spring 32 which surrounds the piston rod, as shown in FIG. 2. The forward end of the piston rod 27 carries a washer 33 which engages the other end of the compression spring 32 whereby the piston 26 is urged to a forward position relative to the fishing rod 10.

Slidably engaging the outer surface of the enlarged diameter portion of the cylinder 24 is a sleeve-like member 34. An elongated slot 36 extends axially of the cylinder 24 at a location forwardly of the forwardmost position of the piston 26 for receiving an inwardly projecting member 37 carried by the member 34 which may be in the form of a transverse pin. The member 37 extends through the piston rod 27 to thus operatively connect the sleeve-like member 34 to the piston rod 27 whereby axial movement of the sleeve-like member 34 imparts axial movement to the piston rod 27. A depending handle 38 is carried by the sleeve-like member 34 for moving the sleeve-like member in a rearward direction. Upon release of the handle 38, the spring 32 then returns the sleeve-like member 34 and the piston 26 to the forwardmost position.

The rear end of the cylinder 24 is provided with an inlet 39 and an outlet 41 for supplying liquid to the pump and discharging liquid therefrom. The pump 23 is provided with a check valve 42 which permits the entry of fluid through the inlet 39 upon movement of the piston 26 to a forward position to the left, as viewed in FIG. 2. Also, a check valve 42a is provided which permits flow of fluid from the cylinder 24 to the outlet 41 in response to movement of the piston 26 in a rearward direction, toward the right as viewed in FIG. 2. The outlet 41 communicates with one end of a flexible conduit 43. The other end of the conduit 43 communicates with the conduit 19 which in turn is connected to the innermost end of the hollow, tubular line 13 carried by the spool 12.

The inlet 39 for the pump is connected to one end of a flexible conduit 44. The other end of the conduit 44 is connected to a container 46 for receivng a supply of scented bait in solution. In view of the fact that different types of fish prefer different odors, the scented bait in solution in the container 46 varies with the type of fish to be caught. For example, sharks are attracted by the smell of blood, catfish are attracted by the smell of onion and other fish are attracted by the smell of squid.

Where it is desired to use the pump 23 for the sole purpose of propelling the lure 14 or 14a into water, the inlet off the supply tube 44may be positioned in the body of water in whichtthe lure is moving whereby the water is circulated through the fishing apparatus and then back to the body of water.

From the foregoing description, the operation of our improved fishing apparatus will be readily understood. The inner end of the hollow fishing line 13 is connected to the end of the conduit or branch line 19 which projects through the opening 21 in the hub of the spool 12. With the line 19 being connected by line 43 to the outlet 41 for the pump 23, the solution discharged from the pump passes through the hollow fishing line 13 and is then discharged outwardly of the lure body 14 or 14a, as the case may be, whereby the liquid is discharged into the body of water adjacent the lure. Where a scented bait solution is placed in the container 46 and the supply conduit 44 communicates with the container 46, the scented bait solution is drawn into the cylinder 24 each time the spring 32 returns the piston to its forwardmost position. Upon rearward movement of the handle 38, the piston 26 forces the scented solution out the check valve 42a through the conduit 43 whereupon the scented solution passes through the tubular line 13 and is discharged outwardly of the lure body into the body of water adjacent the lure. Accordingly, a controlled amount of the scented bait solution is introduced into the water adjacent the lure due to the fact that a positive amount of the scented solution is expelled from the cylinder 24 each time the piston 26 moves to the rear of the cylinder 24.

From the foregoing, it will be seen that we have devised improved fishing apparatus which not only is adapted to supply a scented bait solution to the body of water adjacent the lure but also provides action for the lure since the discharge of liquid from the discharge end of the tubular conduit 13 imparts a jet action to the lure whereby it moves in the water. Also, by providing resilient means for returning the piston to its forwardmost position after each rearward stroke of the piston 26, the solution is drawn inwardly of the supply conduit into the cylinder 24 automatically whereby the cylinder 24 is filled for the next stroke. Furthermore, discharging the liquid into the body of water at selected positions relative to the lure body, different type actions may be imparted to the lure.

While we have shown our invention in but two forms, it will be obvious to those skilled in the art that it is not so limited, but is susceptible of various other changes and modifications without departing from the spirit thereof.

What we claim is:

1. In fishing apparatus having a rod and reel:
   a. a tubular fish line wound on said reel with one end of said tubular fish line passing outwardly of said reel and having a free end disposed to extend outwardly of said rod,
   b. a fluid pump carried by said rod and having an inlet for receiving fluid and an outlet for discharging fluid,
   c. means communicating said outlet with the other end of said tubular fish line,
   d. means supplying liquid to said inlet of said pump,
   e. a fish lure operatively connected to said free end of said line and disposed to move in a body of water, and
   f. at least one discharge opening in said free end of said line discharging liquid outwardly of said lure into said body of water.

2. Fishing apparatus as defined in claim 1 in which said means communicating said outlet of said pump with said other end of said tubular fish line comprises a flexible conduit.

3. Fishing apparatus as defined in claim 1 in which said means supplying liquid to said inlet comprises a supply conduit communicating at one end with said inlet and communicating at the other end thereof with a supply of scented bait in solution.

4. Fishing apparatus as defined in claim 1 in which said fluid pump comprises:
   a. a cylinder extending axially of said rod,
   b. a piston mounted for sliding movement within said cylinder and adapted to draw liquid through said inlet into said cylinder upon movement of said piston in one direction and adapted to force liquid outwardly of said cylinder through said outlet upon movement of said piston in the opposite direction.
   c. resilient means urging said piston toward said one direction, and
   d. actuator means for moving said piston to said second position.

5. Fishing apparatus as defined in claim 4 in which said actuator means comprises:
   a. a sleeve-like member mounted for axial sliding movement along the outer surface of said cylinder,
   b. means operatively connecting said sleeve-like member to said piston, and
   c. a handle carried by said sleeve-like member.

6. Fishing apparatus as defined in claim 5 in which said means operatively connecting said sleeve-like member to said piston comprises: a. an inwardly projecting member carried by said sleeve-like member,
   b. there being an elongated, axially extending opening in said cylinder for receiving said inwardly projecting member, and
   c. a piston rod connected to said piston and said inwardly projecting member.

7. Fishing apparatus as defined in claim 1 in which said discharge opening in said free end of said line is positioned at selected positions relative to said fish lure.

* * * * *